United States Patent
Kato et al.

(10) Patent No.: US 7,882,617 B2
(45) Date of Patent: Feb. 8, 2011

(54) METHOD OF FABRICATING A MAGNETIC RECORDING HEAD FOR PERPENDICULAR RECORDING WITH ENHANCED COVERING POWER

(76) Inventors: Atsushi Kato, 612 Sogaoosawa, Odawara, Kanagawa (JP) 250-0201; Isao Nunokawa, 901-1 Renshoji, Odawara-shi, Kanagawa (JP) 250-0865; Tomohiro Okada, 880 Tajima, Odawara-shi, Kanagawa (JP) 256-0811; Ichiro Oodake, 880 Tajima, Odawara, Kanagawa (JP) 256-0811

( * ) Notice: Subject to any disclaimer, the term of this patent is extended or adjusted under 35 U.S.C. 154(b) by 604 days.

(21) Appl. No.: 11/258,656

(22) Filed: Oct. 25, 2005

(65) Prior Publication Data
US 2006/0090329 A1    May 4, 2006

(30) Foreign Application Priority Data
Oct. 28, 2004    (JP)    ............................... 2004-314800

(51) Int. Cl.
*G11B 5/23*    (2006.01)
*G11B 5/187*    (2006.01)

(52) U.S. Cl. .............. 29/603.11; 29/603.13; 29/603.27; 29/603.07; 360/119.04; 360/119.12; 360/119.13; 360/122; 360/317

(58) Field of Classification Search .............. 29/603.07, 29/603.08, 603.11, 603.13, 603.14, 603.27; 204/192.11, 192.15, 192.22; 360/122, 317, 360/318, 125.04, 125.17, 125.38, 125.41, 360/125.54, 126, 119.02, 119.03, 119.04, 360/119.11, 119.12, 119.13
See application file for complete search history.

(56) References Cited

U.S. PATENT DOCUMENTS

| | | | | |
|---|---|---|---|---|
| 5,256,266 A | * | 10/1993 | Blanchette et al. | .. 204/192.22 X |
| 6,072,671 A | * | 6/2000 | Gill | ........................ 360/125.54 |
| 6,134,079 A | * | 10/2000 | Koshikawa | ............ 360/125.41 |
| 6,754,947 B2 | * | 6/2004 | Stageberg et al. | ........ 360/317 X |
| 7,149,055 B2 | * | 12/2006 | Clinton et al. | ........... 360/122 X |
| 2002/0080523 A1 | * | 6/2002 | Sato et al. | .................... 360/126 |

FOREIGN PATENT DOCUMENTS

| JP | 03080428 A | * | 4/1991 |
|---|---|---|---|
| JP | 08-087715 | | 4/1996 |

* cited by examiner

*Primary Examiner*—A. Dexter Tugbang
(74) *Attorney, Agent, or Firm*—GMG Intellectual Property Law; Guadalupe M. Garcia

(57) ABSTRACT

The main magnetic pole piece of a magnetic head for perpendicular magnetic recording preferably has an inverted trapezoidal shape in order to maintain a sufficient recording magnetic field. Embodiments of the present invention enhance the covering power of the protective film around the main magnetic pole piece of the magnetic head and thereby ensure reliability even when the main magnetic pole piece has such a shape. In one embodiment, the protective film for protecting the main magnetic pole piece is formed by a sputtering apparatus while applying a bias, or it is formed by a carousel type sputtering apparatus or the chemical vapor deposition (CVD) technique.

11 Claims, 7 Drawing Sheets

VIEWED FROM
AIR BEARING SURFACE

VIEWED IN
CROSS SECTION (a)

(b)

TRAILING SIDE

READ HEAD

READING SIDE
(SUBSTRATE SIDE)

SHAPE OF AIR BEARING SURFACE

AIR BEARING SURFACE

CROSS-SECTIONAL VIEW

AIR BEARING SURFACE

FLARE POINT

THROAT HEIGHT

VIEWED FROM AIR BEARING SURFACE  VIEWED IN CROSS SECTION (a)

(b)

VIEWED FROM AIR BEARING SURFACE  VIEWED IN CROSS SECTION (a)

(b)

METHOD OF FABRICATING A MAGNETIC RECORDING HEAD FOR PERPENDICULAR RECORDING WITH ENHANCED COVERING POWER

CROSS-REFERENCES TO RELATED APPLICATIONS

This application claims priority from Japanese Patent Application No. JP2004-314800, filed Oct. 28, 2004, the entire disclosure of which is incorporated herein by reference.

BACKGROUND OF THE INVENTION

The present invention relates to a magnetic head for writing/reading to/from a magnetic recording medium, and a manufacturing method therefor.

A magnetic disk drive uses a magnetic head to write/read data to/from a recording medium. Increasing the recording capacity per unit area of the magnetic disk requires increasing the areal density. However, the conventional longitudinal recording system has a problem in that the areal density cannot be increased due to thermal fluctuations attributed to magnetization of the medium when the bit length of written data is small.

There is a recording technique called "perpendicular recording" which does not cause the above problem. The perpendicular recording system writes a magnetization signal to the disk medium in a direction perpendicular to the surface of the disk. To read data from the medium, the perpendicular recording system, like the longitudinal recording system, can use a head such as: a giant magneto-resistive (GMR) head; a tunneling magneto-resistive (TMR) head, which produces higher read output power; or a CPP (current perpendicular to the plane) type GMR head, which produces a current flowing perpendicular to the film surface. To write data to the medium, on the other hand, the perpendicular recording system must use a single-pole magnetic head. Also in perpendicular recording, increasing the areal density requires increasing the track density and linear recording density. To increase the linear recording density, it is necessary to improve the recording magnetic field gradient of the write head. To accomplish this, the recording medium may have a two-layer structure in which the under layer is a soft under layer (SUL). To enhance the track density, on the other hand, the magnetic head must be formed to have a very small and precise track width.

It should be noted that in the case of perpendicular magnetic recording, the main magnetic pole piece portion of the write head must be protected by an insulating layer to maintain sufficient write performance. For example, patent document 1 (Japanese Patent Laid-Open No. Hei 8-87715) discloses a magnetic head for perpendicular magnetic recording in which a magnetic film having high specific resistance is formed around the main magnetic pole piece for insulation.

BRIEF SUMMARY OF THE INVENTION

In magnetic disk drives, however, a skew angle as shown in FIG. 2 is formed since the magnetic head must access both the inner and outer circumferential sides of the disk. This causes the problem of side writing especially in perpendicular recording, depending on the shape of the main magnetic pole piece. To address this problem, the main magnetic pole piece is preferably formed such that its length in the track width direction is larger on the trailing side than on the substrate side of the magnetic head, that is, the main magnetic pole piece preferably has an inverted trapezoidal shape with respect to the substrate plane. The taper angle of the inverted trapezoidal shape must be increased with decreasing track width, requiring greater covering power of the protective film for protecting the track. That is, if the protective film has poor film quality and therefore exhibits reduced covering power, voids are formed around the main magnetic pole piece near the air bearing surface of the magnetic head facing the magnetic disk. Under the worst case conditions, this might lead to corrosion of the track portion and hence considerably reduced write performance, preventing the drive from delivering satisfactory product performance.

As described above, the above patent document 1 proposes that the main magnetic pole piece portion be insulated by a magnetic film having high specific resistance. Such an arrangement, however, cannot sufficiently protect the main magnetic pole piece since it has an inverted trapezoidal shape.

The present invention has been devised in view of the above problems. It is, therefore, a feature of the present invention to provide a magnetic head for perpendicular recording and a manufacturing method therefor, wherein the magnetic head employs a main magnetic pole piece having an inverted trapezoidal shape but still ensures sufficient covering power of the insulating film around the main magnetic pole piece to maintain write performance.

According to one aspect of the present invention, a magnetic head is characterized in that it comprises a main magnetic pole piece and a lower magnetic pole piece; and the insulating film for protecting the surfaces of the main magnetic pole piece is formed by a sputtering apparatus while applying a bias. Further, according to another aspect of the present invention, the insulating film is formed by a carousel type sputtering apparatus or the chemical vapor deposition (CVD) technique. The insulating film for protecting the surfaces of the main magnetic pole piece is preferably formed of alumina containing no additives or containing an additive such as $SiO_2$.

In magnetic disk drives, a skew angle is formed since the magnetic head must access both the inner and outer circumferential sides of the disk. This causes the problem of side writing especially in perpendicular recording, depending on the shape of the main magnetic pole piece. To overcome this problem, the main magnetic pole piece is preferably formed such that its width is larger on the trailing side than on the substrate side, that is, the main magnetic pole piece preferably has an inverted trapezoidal shape. When the main magnetic pole piece has an inverted trapezoidal shape, it is necessary to increase the covering power of the protective film around the main magnetic pole piece. This is accomplished by applying a bias when forming the protective film, or by use of a carousel type sputtering apparatus or the chemical vapor deposition (CVD) technique. Alternatively, the protective film may be formed in two steps: first a portion of the protective film is formed without applying a bias; and then the remaining portion is formed while applying a bias. In such a case, the portion formed while applying a bias may be set to have a larger thickness than the portion formed without applying a bias to further enhance the effect of the protective film. Especially, when the CVD technique is used, the protective film may be formed of a material such as Si, SiON, SiC, $SiO_2$, $Si_3N_4$, or diamond-like carbon (DLC).

According to the present invention, when a main magnetic pole piece has an inverted trapezoidal shape, the protective film for protecting the main magnetic pole piece is formed by a sputtering apparatus while applying a bias, or it is formed by a carousel type sputtering apparatus or the chemical vapor deposition (CVD) technique. This can increase the covering power of the protective film around the main magnetic pole piece and thereby prevent voids from being formed around the main magnetic pole piece. As a result, it is possible to prevent degradation of write performance.

DETAILED DESCRIPTION OF THE INVENTION

Specific embodiments of the present invention will be described below with reference to the accompanying drawings. It should be noted that in the following figures, like numerals will be used to denote like functional components to facilitate understanding.

Figure 1:
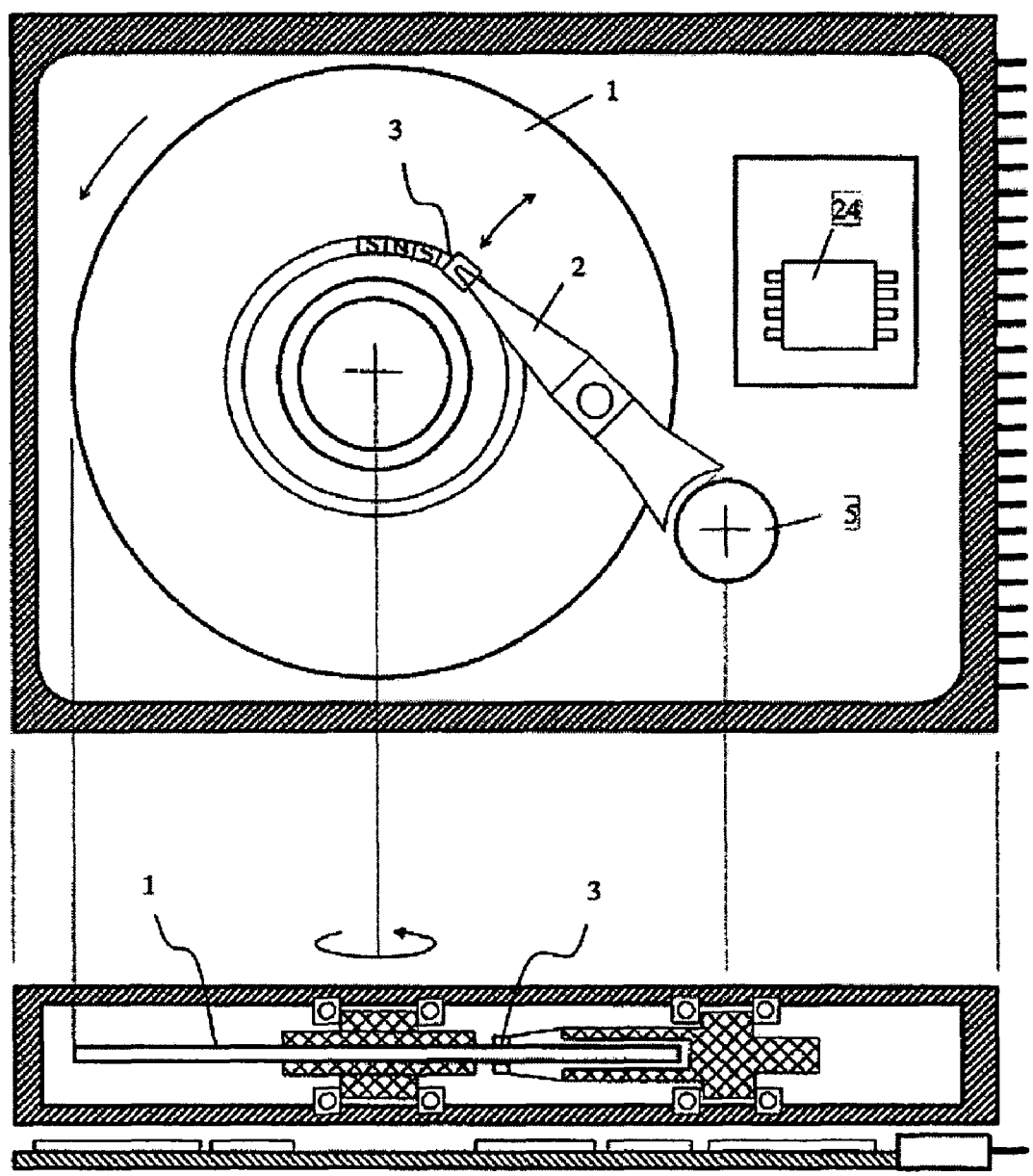
FIG. 1 is a schematic diagram showing the concept of a magnetic read/write device according to the present invention.

FIG. 1 is a schematic diagram showing the concept of a magnetic read/write device according to the present invention. The magnetic read/write device writes/reads a magnetization signal to/from a magnetic disk 1 rotated by a motor by use of a magnetic head 3 fixed to the tip of an arm 2. The arm 2 is moved by an actuator 5 in a disk radial direction such that it is positioned at a target track for a read or write operation. A signal processing circuit 24 processes the write signal for driving the magnetic head 3 or the read signal output from the magnetic head 3.

Figure 2:
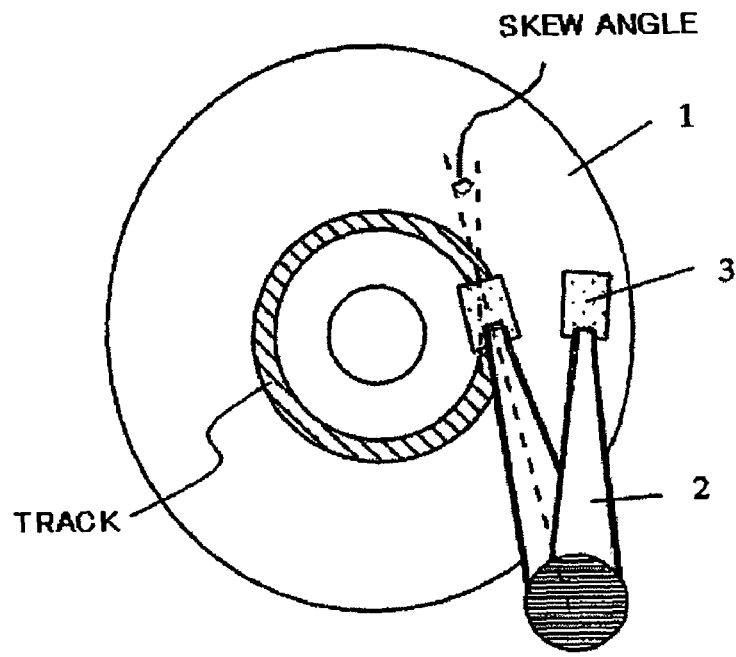
FIG. 2 is a schematic diagram showing how the arm moves in a radial direction of the magnetic disk according to the present invention.

FIG. 2 is a schematic diagram showing how the arm 2 moves in a radial direction of the magnetic disk 1. At that time, a skew angle is formed as shown in the figure. The skew angle is in the range of approximately ±20 degrees.

Figure 3:
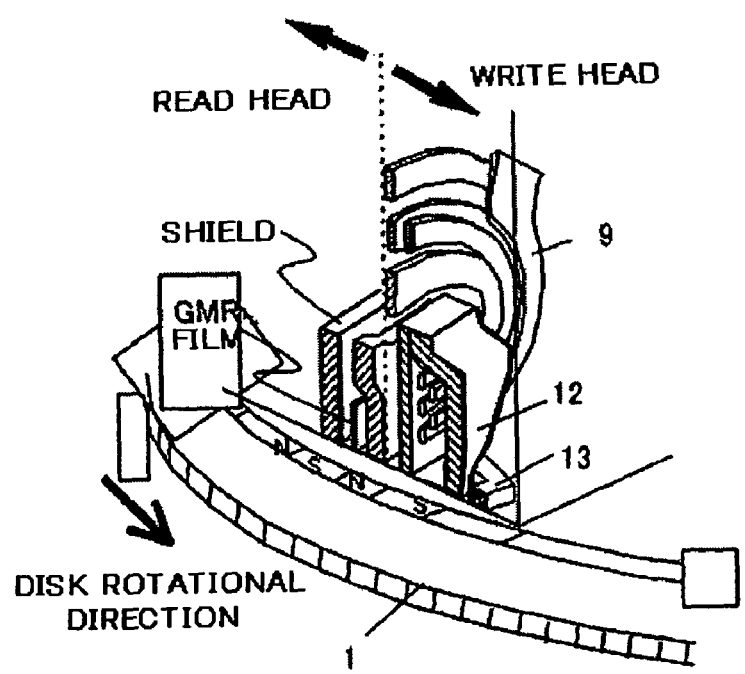
FIG. 3 is a schematic diagram showing the physical relationship between the magnetic head for perpendicular recording and the magnetic disk.
Figure 4:
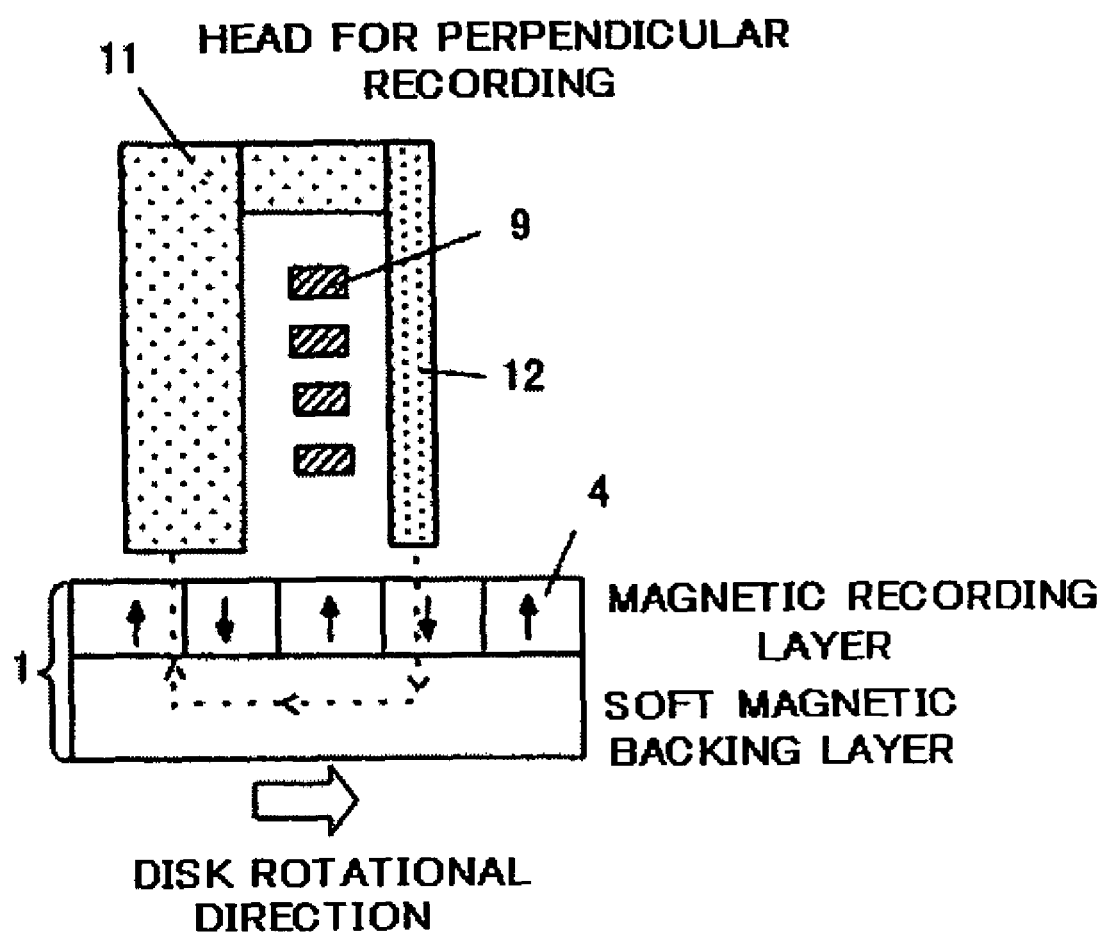
FIG. 4 is a schematic diagram showing the concept of perpendicular recording.

FIG. 3 is a schematic diagram showing the physical relationship between the magnetic head for perpendicular recording and the magnetic disk. FIG. 4 is a schematic diagram showing the concept of perpendicular recording. The magnetic head is made up of a write head and a read head. The write head is used to generate a magnetic field for writing to the recording layer of the magnetic disk 1. It is a single-pole head and includes a main magnetic pole piece 12, a lower magnetic pole piece 11, and a thin film coil 9 linked with the magnetic circuit formed by the main magnetic pole piece 12 and the lower magnetic pole piece 11. The read head is used to read information written on the recording layer of the magnetic disk 1 and includes a magnetoresistive element 15, such as a GMR element, sandwiched by a pair of read shields (a lower magnetic shield 16 and an upper magnetic shield 17). The magnetic field generated from the main magnetic pole piece 12 of the write head goes into the auxiliary magnetic pole piece 11 through the recording layer and the soft magnetic backing layer of the magnetic disk 1, thereby forming a magnetic circuit and writing a magnetization pattern 4 to the recording layer. At that time, due to the relationship between the disk rotational direction and the position of the main magnetic pole piece 12, the shape of the magnetization pattern 4 is very much affected by the shapes of the top surface (on the trailing side) and the side surfaces of the main magnetic pole piece 12 which are the last portions of the magnetic head which leave any point on the magnetic disk 1.

Figure 5:
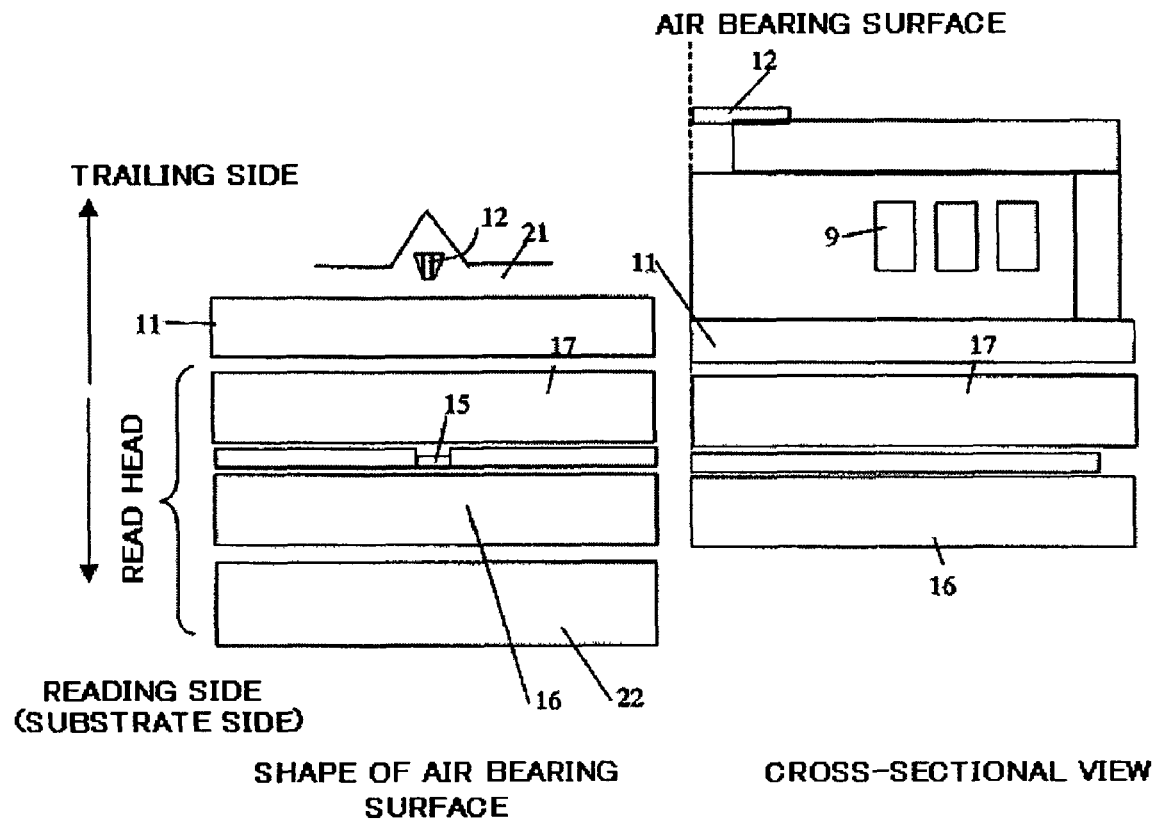
FIG. 5 is a schematic diagram showing an exemplary read/write composite head of the present invention.

FIG. 5 is a schematic diagram showing an exemplary read/write composite head. This read/write composite head comprises a single-pole head and a magnetoresistive element 15 (hereinafter referred to as an MR element) as a write head and a read head, respectively. The single-pole head is made up of the main magnetic pole piece 12 and the lower magnetic pole piece 11 with a gap film 21 therebetween. The MR element 15 is sandwiched by a pair of read shields (the lower magnetic shield 16 and the upper magnetic shield 17). For example, the MR element 15 may be a giant magnetoresistive (GMR) head; a tunneling magnetoresistive (TMR) head, which produces higher read output power; or a CPP type GMR head, which produces a current flowing perpendicular to the film surface. The surface (the air bearing surface) of the main magnetic pole piece 12 facing the magnetic disk has an inverted trapezoidal shape and therefore the film thickness of the main magnetic pole piece 12 decreases as the air bearing surface is approached. This tapered structure of the main magnetic pole piece 12 can increase the recording magnetic field intensity by 30%, as compared to when no taper is provided.

A description will be given of a method for manufacturing the magnetic head shown in FIG. 5. First, the lower magnetic shield 16 and a lower gap film made of alumina, etc. are formed on a substrate 22. Then, the MR element 15 is formed together with a pair of electrodes for drawing a magnetic signal from the MR element 15. Then, after forming an upper gap film made of alumina, etc. and the upper magnetic shield 17, an upper magnetic shield insulating film of alumina, etc. is formed. Then, the lower magnetic pole piece 11 of the magnetic write element is formed on the upper magnetic shield insulating film. After that, a coil 9 and an organic insulating film are formed. The coil 9 carries the current to cause the main magnetic pole piece 12 to generate a magnetic field. Then, the main magnetic pole piece 12 is formed on a stitched pole piece as follows: a film used as the main magnetic pole piece is formed and processed into an inverted trapezoidal shape as described above by a trimming technique, etc. Then, a hard protective film 21 of alumina, etc. for protecting and insulating the above elements is formed such that it covers all the formed elements. Lastly, a write terminal is formed for supplying a current to the coil 9, and furthermore a read terminal is formed for outputting a magnetic signal. The present invention is characterized in that the protective film is formed by a sputtering technique, etc. while applying a bias to the substrate 22. This protective film forming method will be described in detail in connection with first and second embodiments of the present invention.

Figure 6:
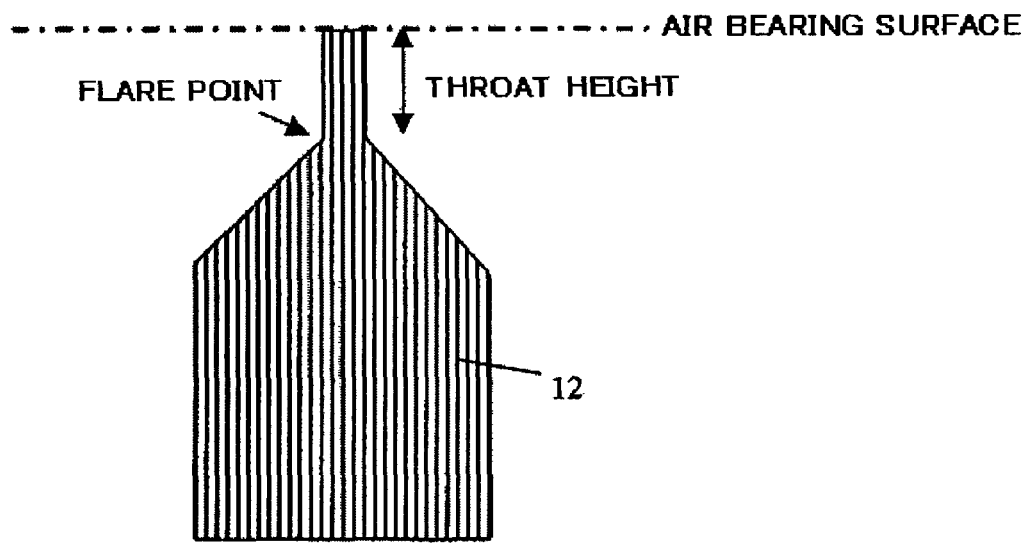
FIG. 6 shows the main magnetic pole piece of an embodiment of the present invention as viewed from the top.

FIG. 6 shows the main magnetic pole piece 12 as viewed from the top. Note the distance between the air bearing surface of the magnetic head facing the magnetic disk and a point (referred to as a flare point) from which the track portion of the main magnetic pole piece 12 progressively widens. This distance is referred to as "throat height."

Figure 7:
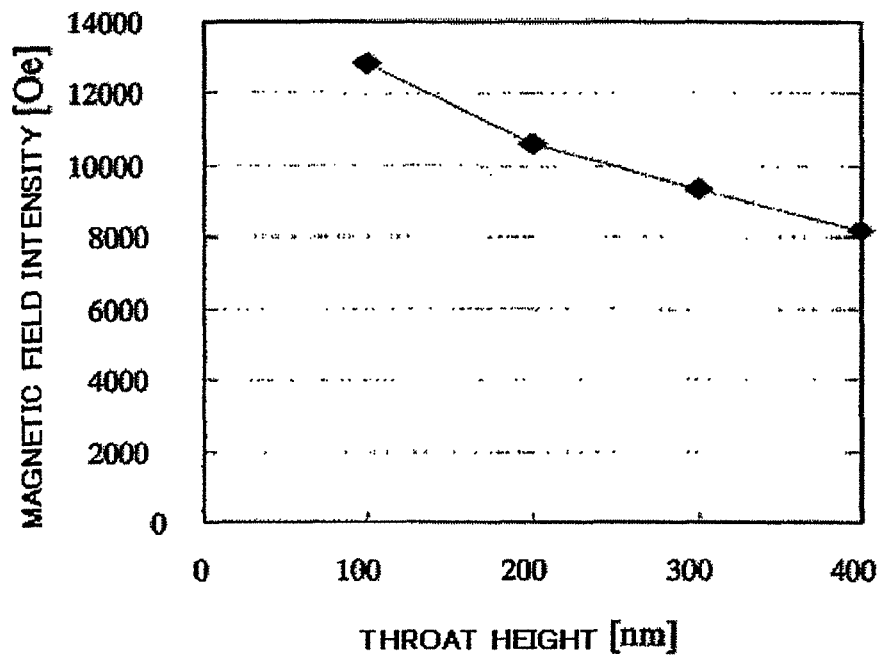
FIG. 7 shows the relationship between the throat height and the recording magnetic field intensity.

FIG. 7 shows the relationship between the throat height and the recording magnetic field intensity. The larger the throat height, the lower the recording magnetic field intensity. Therefore, the throat height is preferably about 300 nm or less. Since the recording magnetic field intensity increases with decreasing throat height as shown in FIG. 7, the throat height may be reduced to increase the intensity. However, this means that the flare point from which the width of the track portion progressively increases becomes closer to the air bearing surface of the magnetic head. It is obvious that as the flare point approaches the air bearing surface, the length of the protective alumina from the air bearing surface to the flare point decreases. As a result, an alumina layer having degraded quality which is formed at the beginning of the alumina film forming process may appear on the air bearing surface, thereby reducing the reliability of the head. Also in view of this, it is important to enhance the covering power of the alumina around the main magnetic pole piece.

Further, in hard disk drives, a skew angle is formed as shown in FIG. 2. Therefore, it is necessary to form the air bearing surface of the main magnetic pole piece of the write head into an inverted trapezoidal shape. If the air bearing surface does not have an inverted trapezoidal shape but a trapezoidal shape, that is, the width of the main magnetic pole piece increases with decreasing distance from the read side, then the alumina will have sufficient covering power to form a flawless protective film around the main magnetic pole piece without applying a bias to the substrate. If, on the other hand, the air bearing surface of the main magnetic pole piece has an inverted trapezoidal shape, then the alumina will not have sufficient covering power around the main magnetic pole piece and as a result voids tend to be formed around the main magnetic pole piece. To prevent this from happening, a bias needs to be applied to the magnetic head substrate during the film forming process such that the sputtered particles are ionized and thereby easily introduced around the main magnetic pole piece.

First Embodiment

Figure 8:
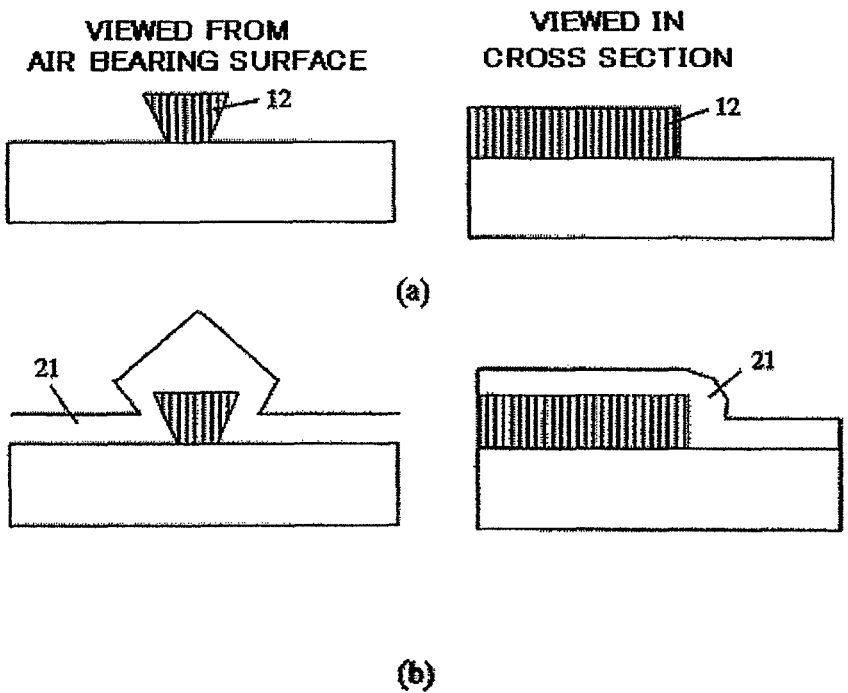
FIG. 8 is a schematic diagram showing a method for manufacturing a write head according to a first embodiment of the present invention.

FIG. 8 is a schematic diagram showing a method for manufacturing a write head according to a first embodiment of the present invention. In the figure, views of the write head as seen from the air bearing surface are provided on the left, while cross-sectional views taken in a height direction of the device are provided on the right.

Specifically, FIG. 8(a) shows how the main magnetic pole piece 12 having an inverted trapezoidal shape is formed on the inorganic insulating film. Since the main magnetic pole piece 12 has an inverted trapezoidal shape, a bias is applied to the substrate when an $Al_2O_3$ film 21 is formed on the main magnetic pole piece by a sputtering technique as a protective film. It should be noted that the bias conditions are chosen such that the bias potential is between about 100 V and 250 V and the bias power is between about 3 kW and 6 kW. It should be further noted that even though the present embodiment applies a positive bias potential to the substrate, the present invention is not limited to positive bias potentials. A negative bias potential may be applied if its absolute value is between about 100 V and 250 V.

FIG. 8(b) shows how the $Al_2O_3$ film 21 covers the main magnetic pole piece 12. Applying a bias to the substrate when forming the $Al_2O_3$ film 21 allows the film to fully cover the shape of the main magnetic pole piece, as shown in the figure. This method can prevent voids from being formed in the $Al_2O_3$ film 21 around the air bearing surface of the main magnetic pole piece. Actually, observation of a sample head formed by this method under an AFM revealed that the $Al_2O_3$ film 21 had bumps only 1 nm or less in height.

Figure 9:
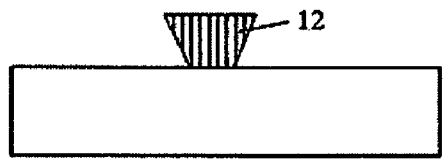
FIG. 9 shows how a protective film is formed on the main magnetic pole piece by a carousel type sputtering apparatus or the chemical vapor deposition (CVD) technique according to another embodiment of the present invention.
Figure 9:
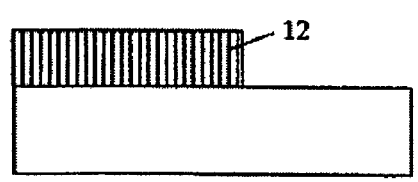
Figure 9:
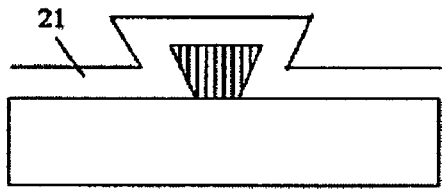
Figure 9:
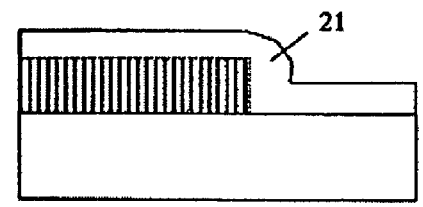

Further, FIG. 9 shows how the $Al_2O_3$ film 21 is formed on the main magnetic pole piece by a carousel type sputtering apparatus or the chemical vapor deposition (CVD) technique. As shown in the figure, the $Al_2O_3$ film 21 fully covers the shape of the main magnetic pole piece and has a substantially uniform thickness. This method also can prevent voids from being formed in the $Al_2O_3$ film 21 around the air bearing surface of the main magnetic pole piece. Actually, observation of a sample head formed by this method under an AFM revealed that the $Al_2O_3$ film 21 had bumps only 1 nm or less in height.

Figure 10:
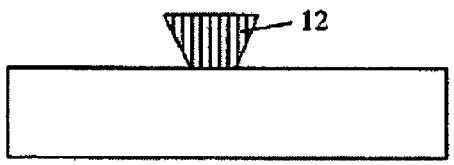
FIG. 10 shows the shape of the protective film around the main magnetic pole piece formed without applying a bias.
Figure 10:
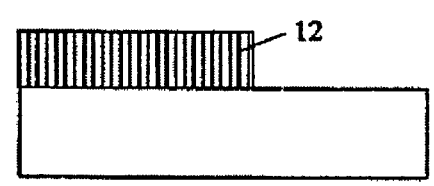
Figure 10:
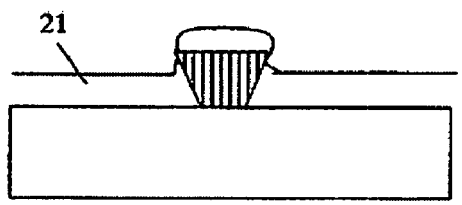
Figure 10:
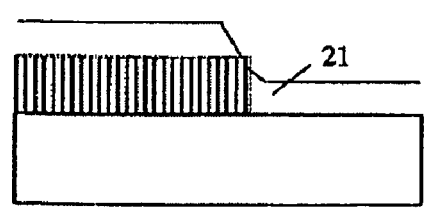

For comparison, FIG. 10 shows the shape of the $Al_2O_3$ film 21 around the main magnetic pole piece formed without applying a bias. As shown in the figure, voids are formed around the tapered portions of the main magnetic pole piece. Actually, observation of a sample head formed by this method under an AFM revealed that the $Al_2O_3$ film 21 had bumps 3 to 5 nm in height. Existence of such large bumps means that the ABS protective film has insufficient covering power, which induces corrosion of the air bearing surface and thereby prevents the head from delivering satisfactory performance.

Second Embodiment

Figure 11:
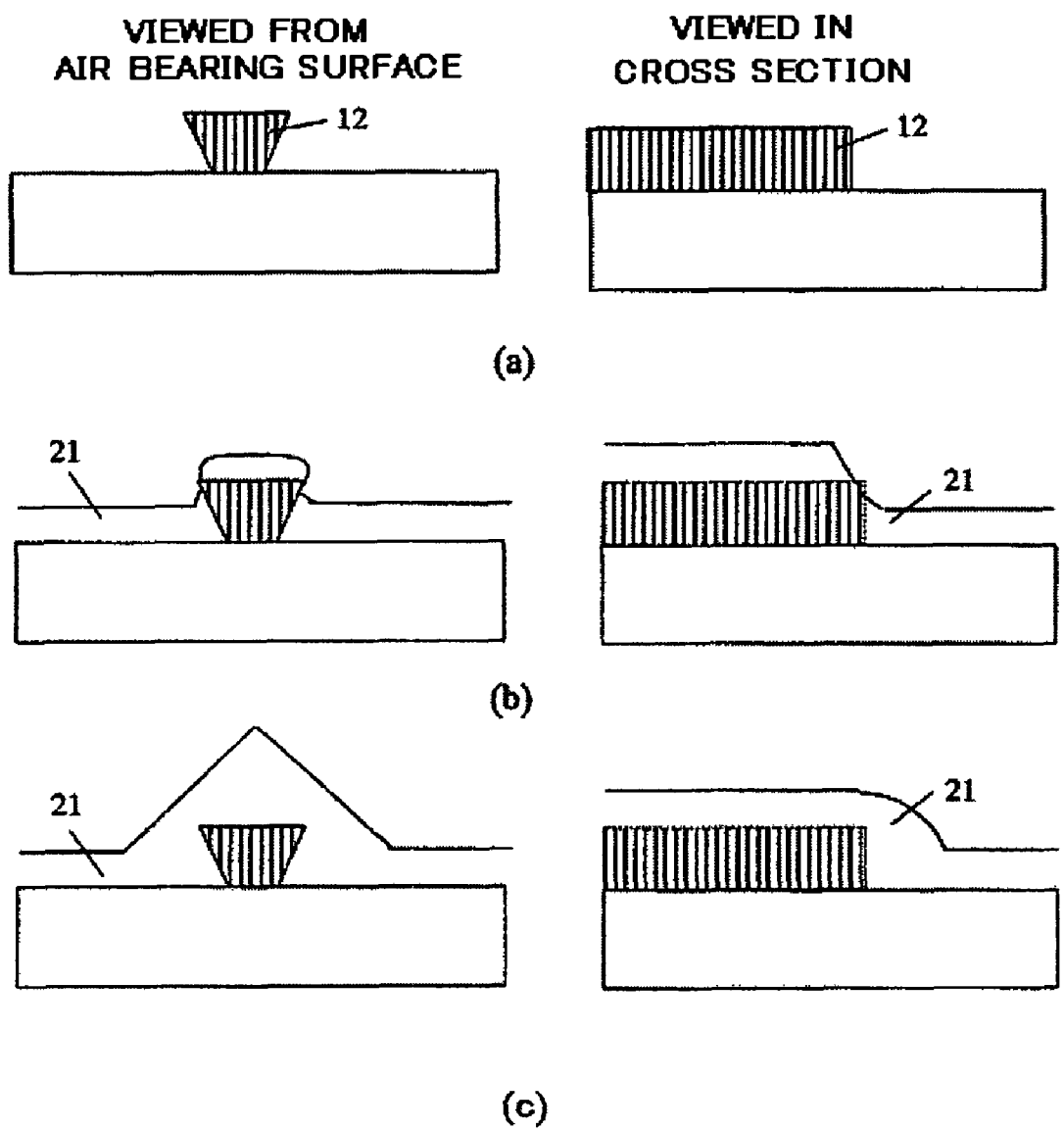
FIG. 11 shows a method for forming a protective film around the main magnetic pole piece according to a second embodiment of the present invention, wherein first a portion of the protective film is formed without applying a bias, and then the remaining portion is formed while applying a bias.

FIG. 11 shows a method for forming the $Al_2O_3$ film 21 on the main magnetic pole piece by a sputtering technique according to a second embodiment of the present invention. Specifically, this method includes two steps: first, a portion of the $Al_2O_3$ film 21 is formed without applying a bias; and then the remaining portion is formed while applying a bias. This method allows the $Al_2O_3$ film 21 to have considerable covering power and hence substantially fully cover the main magnetic pole piece even when the main magnetic pole piece has an inverted trapezoidal shape, that is, whether the $Al_2O_3$ film 21 fully covers the main magnetic pole piece does not largely depend on the shape of the main magnetic pole piece. Actually, observation of a sample head formed by this method under an AFM revealed that the $Al_2O_3$ film 21 had bumps only 1 nm or less in height. Furthermore, no voids were observed in the $Al_2O_3$ film 21 around the main magnetic pole piece.

In the case of the first embodiment, sputtered particles are attracted to the substrate side when a bias is applied thereto, which may lead to slightly etching the main magnetic pole piece. To prevent occurrence of such etching, the present embodiment forms the $Al_2O_3$ film 21 in two steps: first a portion of the $Al_2O_3$ film 21 is formed without applying a bias; and then the remaining portion is formed while applying a bias. This can prevent occurrence of etching as described above, thereby preventing degradation of write characteristics.

It should be noted that according to the present embodiment, the portion of the protective film (the $Al_2O_3$ film 21) formed while applying a bias tends to be larger in thickness than the portion formed without applying a bias, since applying a bias to the substrate increases the covering power of the protective film around the main magnetic pole piece.

It should be noted that even though the above embodiments use $Al_2O_3$ as a material for protecting the main magnetic pole piece, the present invention is not limited to this particular material. Examples of other suitable materials include SiC, AlN, $Ta_2O_5$, TiC, $TiO_2$, and $SiO_2$. Further, when the CVD technique is used, the film for protecting the main magnetic pole piece may be formed of a material such as Si, SiON, SiC, $SiO_2$, $Si_3N_4$, or diamond-like carbon.

It is to be understood that the above description is intended to be illustrative and not restrictive. Many embodiments will be apparent to those of skill in the art upon reviewing the above description. The scope of the invention should, therefore, be determined not with reference to the above description, but instead should be determined with reference to the appended claims alone with their full scope of equivalents.

What is claimed is:

1. A method for manufacturing a magnetic head, comprising:
    forming a read head on a substrate;
    forming a lower magnetic pole piece on said read head;
    forming a main magnetic pole piece on said lower magnetic pole piece; and
    forming a protective film on a surface of said main magnetic pole piece for protecting said main magnetic pole piece,
    wherein said protective film is formed while applying a bias to said substrate,
    wherein an air bearing surface of said main magnetic pole piece facing a magnetic disk has a tapered shape in which a length of said air bearing surface in a track width direction decreases with decreasing distance from said substrate, and is narrower than an overall width of the lower magnetic pole piece,
    wherein said protective film fully covers the tapered shape of the main magnetic pole piece,
    wherein a thickness of said protective film is constant along a perpendicular between the surface of said main magnetic pole piece and an outer surface of the said protective film such that said protective film conforms to the surface of said main magnetic pole piece.

2. The method as claimed in claim 1, wherein said read head includes:
    a lower magnetic shield formed on said substrate;
    a magneto-resistive element formed on said lower magnetic shield; and
    an upper magnetic shield formed on said magneto-resistive element.

3. The method as claimed in claim 1, wherein said main magnetic pole piece has a throat height of about 300 nm or less.

4. The method as claimed in claim 1, wherein said protective film is formed by a sputtering technique.

5. The method as claimed in claim 1, wherein said protective film is foamed by a CVD technique.

6. The method as claimed in claim 5, wherein said protective film comprises a material selected from the group consisting of Si, SiON, SiC, $SiO_2$, $Si_3N_4$, and diamond-like carbon (DLC).

7. The method as claimed in claim 1, wherein said protective film is formed by a sputtering apparatus while applying a bias.

8. The method as claimed in claim 1, wherein said protective film is formed of alumina containing no additives or containing $SiO_2$.

9. The method as claimed in claim 1, wherein:
    said protective film includes a first protective film and a second protective film; and
    said first protective film is formed without applying a bias, and said second protective film is formed while applying a bias.

10. The method as claimed in claim 9, wherein a thickness of said second protective film is larger than a thickness of said first protective film.

11. The method as claimed in claim 1, wherein said protective film comprises a material selected from the group consisting of $Al_2O_3$, SiC, AlN, $Ta_2O_5$, TiC, $TiO_2$, and $SiO_2$.

* * * * *

UNITED STATES PATENT AND TRADEMARK OFFICE
CERTIFICATE OF CORRECTION

PATENT NO.         : 7,882,617 B2                                  Page 1 of 1
APPLICATION NO.    : 11/258656
DATED              : February 8, 2011
INVENTOR(S)        : Kato et al.

It is certified that error appears in the above-identified patent and that said Letters Patent is hereby corrected as shown below:

Title Page, please insert the assignee information as follows:

Item --(73) Assignee: Hitachi Global Storage Technologies Netherlands B.V., Amsterdam (NL)--

Signed and Sealed this
Fifteenth Day of May, 2012

David J. Kappos
*Director of the United States Patent and Trademark Office*